United States Patent [19]

Kondo

[11] Patent Number: 4,561,855
[45] Date of Patent: Dec. 31, 1985

[54] FRICTION CLUTCH

[75] Inventor: Makoto Kondo, Saitama, Japan

[73] Assignee: Honda Giken Kogyo Kabushiki Kaisha, Tokyo, Japan

[21] Appl. No.: 416,308

[22] Filed: Sep. 9, 1982

[30] Foreign Application Priority Data

Sep. 11, 1981 [JP] Japan .............................. 56-143513

[51] Int. Cl.[4] .............................................. F16D 7/00
[52] U.S. Cl. .................................. 464/47; 192/56 R; 192/70.28
[58] Field of Search ..................... 464/47, 46, 45, 92; 192/56 R, 55, 54, 70.28, 89 R; 123/90.31

[56] References Cited

U.S. PATENT DOCUMENTS

| | | | |
|---|---|---|---|
| 3,016,120 | 1/1962 | Häusserman et al. | 192/70.28 X |
| 3,064,455 | 11/1962 | Gros | 464/47 |
| 3,319,751 | 5/1967 | Sacchini | 464/46 X |
| 3,605,443 | 9/1971 | Redelman | 464/46 |
| 3,822,772 | 7/1974 | Murakami | 192/70.28 X |
| 4,043,149 | 8/1977 | Tuninetti | 464/46 |
| 4,445,876 | 5/1984 | Entrup | 464/46 X |
| 4,465,037 | 8/1984 | Tanaka | 464/92 |

Primary Examiner—Stephen Marcus
Assistant Examiner—L. J. Peters
Attorney, Agent, or Firm—Irving M. Weiner; Joseph P. Carrier; John J. Cantarella

[57] ABSTRACT

A friction clutch including a clutch disc member retained in a clutch outer member securely mounted on one of two opposing shafts and pressed against a rotationally blocked friction disc on the other shaft to transmit torque thereto. The clutch outer member has a notched cylindrical body, and the clutch disc member, which is accommodated in the cylindrical body, has a projection extending radially outwardly from a circumferential portion thereof and loosely fitted in the notch. The clutch construction ensures smooth coupling of the two shafts in spite of abrupt changes in load conditions, thus protecting the associated component parts from mechanical shocks.

13 Claims, 6 Drawing Figures

大561,855

FRICTION CLUTCH

BACKGROUND OF THE INVENTION

1. Field of the Invention

The present invention relates generally to a friction clutch. More particularly, the invention relates to a friction clutch which transmits power by the frictional force produced between a clutch disc and a friction disc.

2. Description of Relevant Art

Friction clutches of the type which are widely used for power transmissions in motor vehicles and machine tools are generally arranged to couple a main drive shaft and a follower shaft with each other by pressing a clutch disc and a friction disc to produce a frictional force between the contacting faces thereof. The clutch disc is usually axially movably retained in a clutch outer member or casing which is fixedly mounted on the shaft in such a manner as to restrict rotational movement of the clutch disc.

SUMMARY OF THE INVENTION

It is an object of the present invention to provide a friction clutch which is capable of smoothly coupling a main drive shaft and a follower shaft even if there should occur an abrupt change or changes in load conditions on the side of the main drive shaft, thereby protecting the power transmission system against undesirable mechanical shocks.

The present invention provides a friction clutch which comprises, in combination: a clutch outer member rotatable about a predetermined axis of rotation and provided with at least one trap notch in the circumferential wall thereof; at least one clutch disc member rotatable about the axis of rotation and having a projection loosely fitted in the aforesaid notch; and at least one friction disc rotatable about the axis of rotation and pressed against the clutch disc member.

The above and further objects, features and advantages of the present invention will become apparent from the following detailed description when read in conjunction with the accompanying drawings which show preferred embodiments of the present invention by way of example.

DETAILED DESCRIPTION OF PREFERRED EMBODIMENTS

Figure 1:
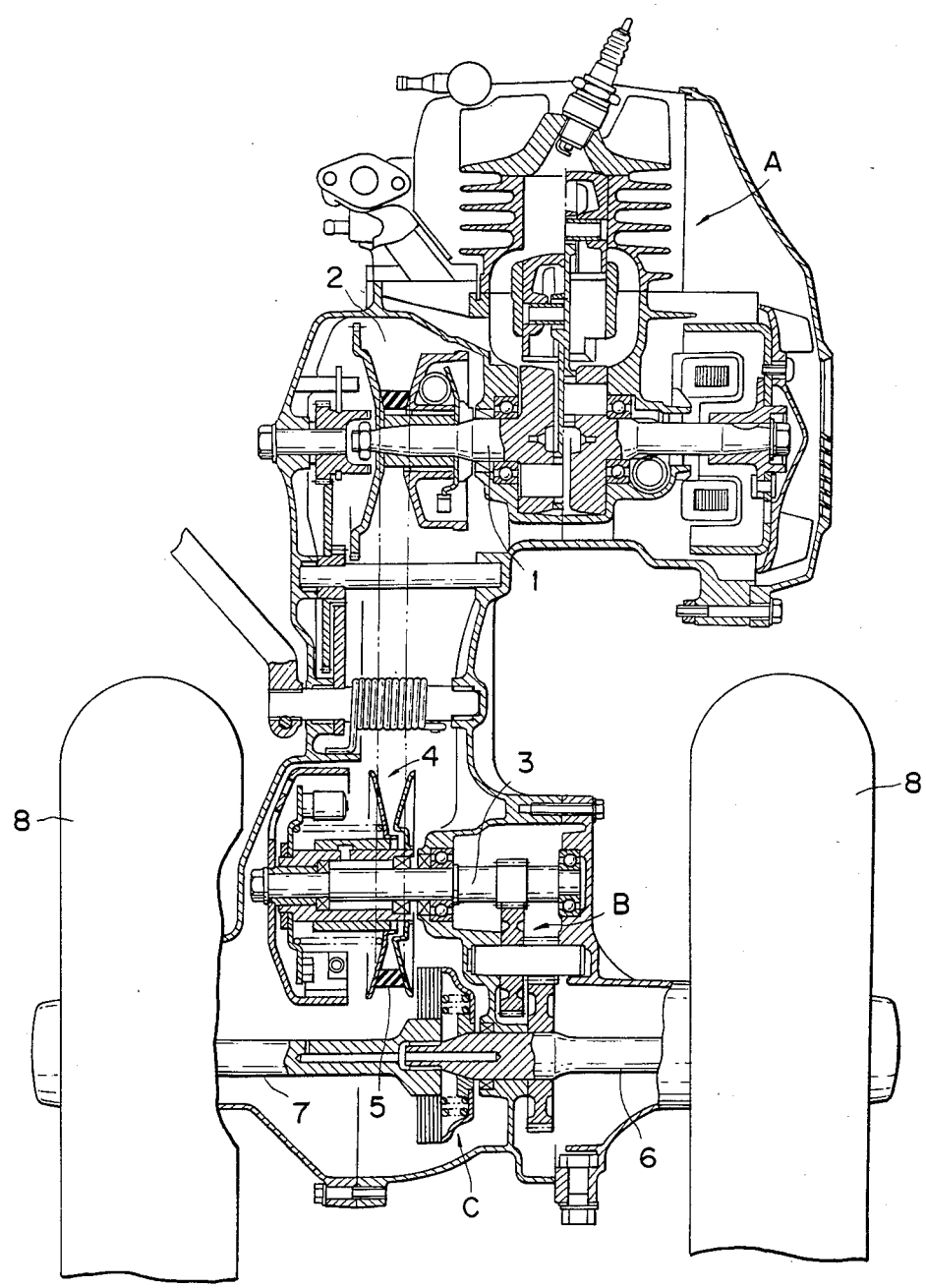
FIG. 1 is a schematic horizontal sectional view of a transmission system of a motor vehicle incorporating a friction clutch in accordance with the present invention.

With reference to FIG. 1, there is shown a crankshaft 1 which constitutes an output shaft of an engine A, the crankshaft 1 being provided with a drive pulley 2 at the projected end thereof.

The drive pulley 2 is connected through a V-belt 5 to a driven pulley 4 mounted on a driven shaft 3 which is rotatably supported in a substantially horizontal position rearwardly of the crankshaft 1 substantially in parallel relation therewith, thus defining a known belt-type automatic transmission. The driven shaft 3 is connected through a reduction gear train B to one wheel axle 6 which is coupled with the other coaxial wheel axle 7 by a friction clutch according to the present invention. The outer ends of the two wheel axles 6 and 7 are connected to vehicle wheels 8.

Figure 2:
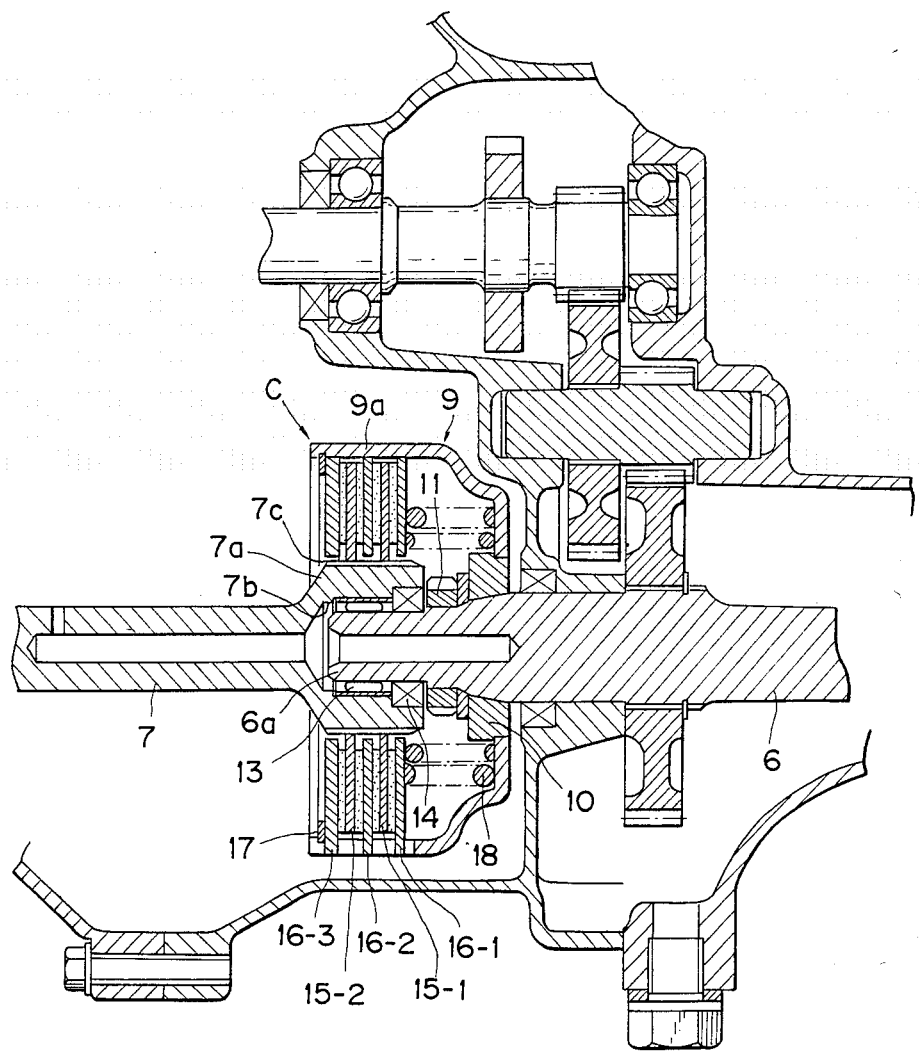
FIG. 2 is an enlarged plan view of the friction clutch of FIG. 1.
Figure 3:
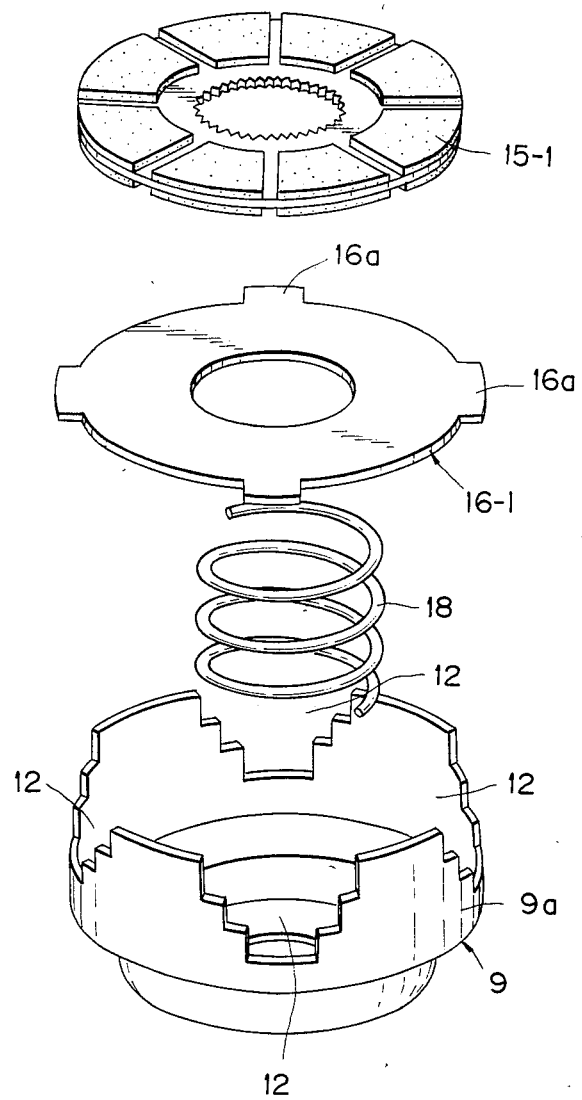
FIG. 3 is an exploded perspective view of the friction clutch assembly.
Figure 4:
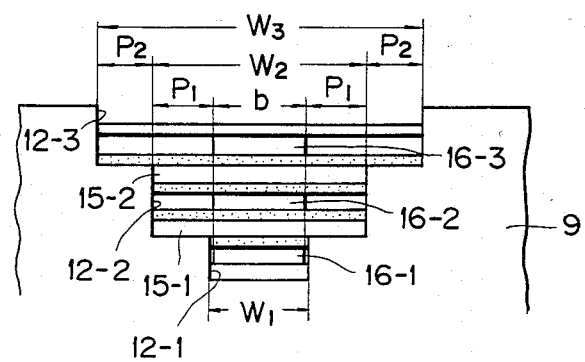
FIG. 4 is a fragmentary plan view of the clutch disc and a clutch outer member in an engaged state.

The friction clutch C of the present invention is constructed as shown in greater detail in FIGS. 2 through 4. The wheel axle 6 has a substantially cup-shaped clutch outer member 9 integrally and fixedly clamped to the inner end thereof through a fixing member 10 and a nut 11. As shown particularly in FIGS. 3 and 4, the clutch outer member 9 is provided with stepped trap notches 12 in the cylindrical body portion 9a thereof at four equidistant positions, i.e., at intervals of 90°.

As shown in FIG. 2, the wheel axle 7 is provided with a hollow larger-diameter portion 7a at the inner end thereof, which is provided with a central cavity 7b to receive the reduced diameter portion 6a at the inner end of the wheel axle 6. A bearing 13 is inserted between the peripheral wall of the cavity 7b and the reduced diameter portion 6a of the wheel axle 6 to permit relative rotation of the axles 6 and 7. Also provided is an oil seal 14.

The wheel axle 7 is provided with a plurality of axial spline grooves 7c around the enlarged diameter portion 7a thereof, and a plurality of friction discs (two friction discs 15-1 and 15-2 in the present embodiment) are splined in the grooves 7c. The friction discs 15-1 and 15-2 are slidable in the axial direction and integrally rotatable with the wheel axle 7. The clutch C further includes a plurality of clutch discs, with three clutch discs 16-1 to 16-3 being provided in the present embodiment, which are disposed alternately on opposite sides of the friction discs 15-1 and 15-2 in a sandwiched manner to constitute a multiple disc clutch.

Each one of the clutch discs 16-1 to 16-3 are integrally formed with outwardly projecting tabs 16a at four equidistant positions around the outer periphery thereof, i.e., at intervals of 90°, as shown particularly in FIG. 3, which are axially movable within the notches 12 of the clutch outer member 9 and rotatable by engagement therewith. More particularly, each stepped notch 12 of the outer member 9 has a width $W_1$ at a first step position 12-1 at the bottom thereof, which is substantially equivalent to the width b of the projecting tabs 16a of the clutch discs 16-1 to 16-3 as shown in FIG. 4, and an increased width $W_2$ at the second step position 12-2 and a further increased width $W_3$ at the third step position 12-3. Therefore, the clutch disc 16-1 is tightly fitted in the notch 12 at the first step position 12-1 as shown in FIG. 4, while the clutch discs 16-2 and 16-3 in the second and third step positions 12-2 and 12-3 are loosely disposed in the notch 12 with plays $P_1$ and $P_2$, respectively.

The axial movements of the friction discs 15-1 and 15-2 as well as the clutch discs 16-1 to 16-3 are limited by a stopper ring 17 which is fitted around the inner periphery at the open end of the clutch outer member 9, and are held under a constant pressure imposed by a compression spring 18 which is mounted in the outer member 9.

The multiple disc friction clutch C of the above-described construction operates as follows.

The power which is generated by the engine A is transmitted to and rotatably drives one wheel axle 6 through the crankshaft 1, drive pulley 2, V-belt 5, driven pulley 4, driven shaft 3 and reduction gear train B. Simultaneously, the other wheel axle 7 is coupled with and rotated with the wheel axle 6 by the friction clutch C, more particularly, by the frictional resisting force which is produced between the contacting faces of the friction discs 15-1 and 15-2 and clutch discs 16-1 to 16-3 of the friction clutch C. The rotation of the wheel axles causes the vehicle wheels 8 to rotate to drive the vehicle forward.

If for some reason there occurs an abrupt increase in load on the side of the main driving shaft or the wheel axle 6 when the friction clutch C is in the position of FIG. 4, i.e., when the tabs 16a of the clutch discs 16-1 to 16-3 are in neutral positions relative to the notch 12 of the outer member 9, the increment in load is first transmitted to the clutch disc 16-1 which is tightly fitted in the first step position of the notch 12. Part of the load transmitted to the clutch disc 16-1 is borne by the friction disc 15-1 which is in contact with the clutch plate 16-1, due to the increase of the frictional force produced by the contacting faces of the clutch disc 16-1 and friction disc 15-1.

However, when the afore-mentioned increment in load cannot be borne by the aforesaid increased frictional force alone, a slip occurs in the clutch C, bringing the next clutch disc 16-2 in the second step position into abutting engagement with the outer member 9 to sustain part of the remainder of the load by an increased frictional force produced by the contacting faces of the clutch disc 16-2 and the friction discs 15-1 and 15-2.

Upon a further slip of the clutch C, the clutch disc 16-3 in the uppermost third step position is abutted against the outer member 9 to similarly bear the remainder of the load by the increased frictional force produced by the contacting faces of the clutch disc 16-3 and the friction disc 15-2.

In this manner, even if there should occur a sudden variation in the load on the side of the wheel axle 6, it is transmitted stepwise to the wheel axle 7, thereby constantly ensuring smooth power transmission while protecting the power transmission system from mechanical shocks and thus prolonging the service life of the mechanical parts which constitute the transmission system.

It will be understood that relative movements of the clutch disc tabs within the steps of the trap notches 12 of outer member 9 occur in either opposite direction depending upon the shock or load, such as the shock of the engine power acting on the clutch device at the starting of the vehicle as opposed to that occurring at times of engine-braking, for example. Further, some of the tabs normally stop such relative movements with respect to the notch steps at intermediate positions therein.

The clutch disc tabs and the trap notches 12 are arranged such that the tab is capable of relative movement with respect to the notch 12 within a distance permitted by the notch so that the clutch disc member is capable of substantial relative rotation with respect to the clutch outer member. The spring 18 normally urges the friction disc and the clutch disc member against each other and permits such relative movement of the tab with respect to the notch when a torque to be transmitted by the clutch exceeds a predetermined torque.

The vehicle wheels 8 are mounted at a distance from each other, so that it is normally necessary to provide means for producing a rotational differential between the two wheels at particular times during operation. However, in the foregoing embodiment, the rotational differential can be produced by the slips which take place between the friction discs 15-1 and 15-2 and the clutch discs 16-1 to 16-3 of the friction clutch C. In other words, the friction clutch C also functions as a differential system. In such a case, the differential operation is performed smoothly for the same reasons as set forth hereinabove.

Figure 5:
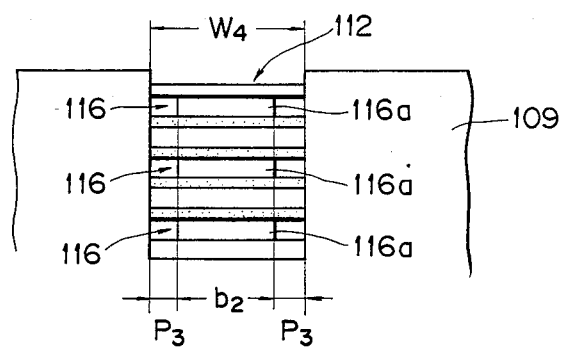
FIG. 5 is a view similar to FIG. 4 but showing a modified construction of the friction clutch according to the present invention.
Figure 6:
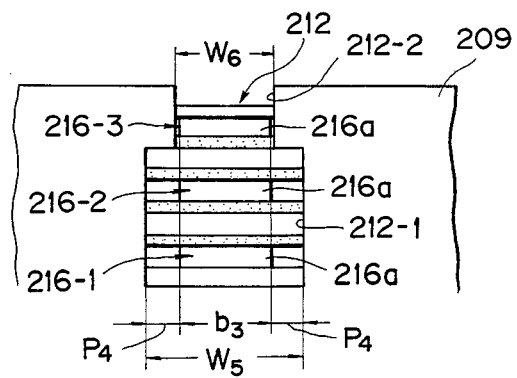
FIG. 6 is a view similar to FIG. 4 but showing a further modified construction of the friction clutch according to the present invention.

FIGS. 5 and 6 illustrate further embodiments of modified constructions of the present invention.

In the embodiment shown in FIG. 5, the clutch outer member 109 is provided with notches 112 of a uniform width $W_4$, receiving therein radial projections 116a of the clutch discs 116. The radial projections 116a have different widths $b_2$ and are loosely fitted in the notches 112 with a play $P_3$ of the same extent between each projection 116a and the notch 112.

In the modification shown in FIG. 6, the clutch outer member 209 is provided with notches 212 having a first broader portion 212-1 and a second narrower portion 212-2 with widths $W_5$ and $W_6$ ($W_5 > W_6$), respectively. The first and second clutch discs 216-1 and 216-2 have the respective radial projections thereof of a width $b_3$ loosely fitted in the first broader notch portion 212-1 with a play $P_4$ on opposite sides thereof as shown in FIG. 6, while the radial projections 216a of the third clutch disc 216-3 are tightly fitted in the second narrower notch portion 212-2.

In the above-described modified embodiments, the clutch also transmits the power stepwise to ensure smooth coupling of the two axles.

Although the multiple disc friction clutch of the present invention has been described hereinabove with respect to wheel axles of a motor vehicle, it is to be understood that similar effects can be obtained by a clutch having a single step and that the present invention can be applied to various types of power transmitting mechanisms.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A friction clutch for a vehicle, comprising:
   a clutch outer member rotatable about a predetermined axis of rotation and provided with at least one trap notch in a circumferential wall thereof;
   at least one clutch disc member rotatable about said axis of rotation and having a projection loosely received in said notch;
   said projection and said notch being arranged such that said projection is capable of relative movement with respect to said notch within a distance permitted by said notch so that said clutch disc member is capable of substantial relative rotation with respect to said clutch outer member;

at least one friction disc rotatable about said axis or rotation; and spring means for normally urging said friction disc and said clutch disc member against each other and for permitting said relative movement of said projection with respect to said notch when a torque to be transmitted by said clutch exceeds a predetermined torque.

2. A friction clutch according to claim 1, wherein:

said circumferential wall of said clutch outer member is substantially cylindrical in shape and open at one end;

said trap notch is cut into said circumferential wall from said open end;

said clutch disc member comprises a disc portion received in said circumferential wall and said projection extending radially outwardly of said disc portion; and said friction disc member is substantially circular in shape.

3. A friction clutch according to claim 1, wherein:

said radial projection is loosely fitted in said notch with a play relative to the rotation about said axis.

4. A friction clutch according to claim 1, wherein:

said clutch outer member is provided with a plurality of trap notches, and said clutch disc member is provided with a corresponding number of said radial projections each loosely fitted in one of said trap notches.

5. A friction clutch according to claim 4, wherein:

said trap notches are provided at substantially equidistant angular positions around said axis of rotation.

6. A friction clutch according to claim 1, wherein:

said clutch is provided with a plurality of said clutch disc members and a plurality of said friction disc members, each one of said friction disc members being pressed against at least one of said clutch disc members.

7. A friction clutch according to claim 6, wherein:

the number of said clutch disc members is greater than the number of said friction disc members by one, and each one of said friction disc members is sandwiched between two adjacent clutch disc members.

8. A friction clutch according to claim 6, wherein:

said radial projections of said clutch disc members are respectively fitted in said trap notches with a play of the same width.

9. A friction clutch according to claim 8, wherein:

said notches are provided with substantially straight side edges substantially parallel with said axis of rotation.

10. A friction clutch according to claim 6, wherein:

said radial projection of each respective clutch disc member is loosely fitted stepwise in said notch with plays of different widths.

11. A friction clutch according to claim 10, wherein:

said trap notch has a width which is broadened stepwise toward said open end.

12. A friction clutch according to claim 1, further comprising:

another clutch disc member which has a radial projection fitted substantially tightly in said trap notch and is pressed against said friction disc member and rotatable with said clutch outer member about said axis of rotation.

13. A friction clutch according to claim 1, 2, 3, 4, 5, 6, 7, 8, 9, 10, 11 or 12, wherein:

said clutch disc member and said friction disc member are slidable in the axial direction.

* * * * *